(12) United States Patent
Lewis et al.

(10) Patent No.: US 12,242,615 B2
(45) Date of Patent: *Mar. 4, 2025

(54) ADVERSARIAL REINFORCEMENT LEARNING SYSTEM FOR SIMULATING SECURITY CHECKPOINT ENVIRONMENTS

(71) Applicant: NOBLIS, INC., Reston, VA (US)

(72) Inventors: Brian Jacob Lewis, Washington, DC (US); Jason Adam Deich, Arlington, VA (US); Stephen John Melsom, Reston, VA (US); Kara Jean Dodenhoff, Reston, VA (US); William Tyler Niggel, Wilmington, NC (US)

(73) Assignee: NOBLIS, INC., Reston, VA (US)

( * ) Notice: Subject to any disclaimer, the term of this patent is extended or adjusted under 35 U.S.C. 154(b) by 236 days.

This patent is subject to a terminal disclaimer.

(21) Appl. No.: 17/892,228

(22) Filed: Aug. 22, 2022

(65) Prior Publication Data

US 2022/0414231 A1 Dec. 29, 2022

Related U.S. Application Data

(63) Continuation of application No. 16/864,826, filed on May 1, 2020, now Pat. No. 11,423,157.

(60) Provisional application No. 62/847,592, filed on May 14, 2019.

(51) Int. Cl.
*G06F 21/00* (2013.01)
*G06F 21/56* (2013.01)
*G06F 21/57* (2013.01)

(52) U.S. Cl.
CPC .......... *G06F 21/577* (2013.01); *G06F 21/566* (2013.01); *G06F 2221/034* (2013.01)

(58) Field of Classification Search
CPC .. G06F 21/554; G06F 2221/031; G06F 3/016; G06F 3/046; G06F 3/044; G06F 3/0488; G06F 2203/04101; G06F 3/0219; G06F 3/0238; G06F 3/03547; G06F 21/88; G06F 30/39; G06F 3/0231; G06F 21/83; G06F 21/82; G06F 21/70; H04N 7/188
See application file for complete search history.

(56) References Cited

U.S. PATENT DOCUMENTS 9,537,884 B1 * 1/2017 Raugas ............... H04L 63/1433

OTHER PUBLICATIONS

Castro. Aug. 27, 2018. "Introducing a New Framework for Flexible and Reproducible Reinforcement Learning Research," Google AI Blog; 3 pages.

(Continued)

*Primary Examiner* — Tri M Tran
(74) *Attorney, Agent, or Firm* — Morrison & Foerster LLP (57) ABSTRACT

An adversarial reinforcement learning system is used to simulate a spatial environment. The system includes a simulation engine configured to simulate a spatial environment and various objects therein. The system further includes a first model configured to control objects in the simulation and a second model configured to control objects in the simulation. The first model generates a threat-mitigation input to control one or more objects in the simulation, and the second model generates a threat input to control one or more objects in the simulation. The system then executes a first portion of the simulation based at least in part of the threat mitigation input and the threat input.

21 Claims, 3 Drawing Sheets

(56) References Cited

OTHER PUBLICATIONS

Gil. "Learning by Experimentation: Incremental Refinement of Incomplete Planning Domains," Machine Learning, Proceedings of the Eleventh International Conference, Jul. 10-13, 1994, Rutgers University, New Brunswick, NJ; pp. 87-95.
Lewis et al., U.S. Office Action dated Mar. 30, 2022, directed to U.S. Appl. No. 16/864,826; 5 pages.
Morral et al. (2012). "Modeling Terrorism Risk to the Air Transportation System," RAND Corporation ; 170 pages.
Silver et al. (2017). "Mastering the game of Go without human knowledge," Nature; 43 pages.
Zhang et al., (2016). "Validation, Verification, and Uncertainty Quantification for Models with Intelligent Adversaries," University of Buffalo; 19 pages.
Zhuang et al. (2011). "Technology Evolutionary Games in Complex Transportation Systems in the Face of Adaptive Adversaries," University of Buffalo; 14 pages.

* cited by examiner

ADVERSARIAL REINFORCEMENT LEARNING SYSTEM FOR SIMULATING SECURITY CHECKPOINT ENVIRONMENTS

CROSS-REFERENCE TO RELATED APPLICATION

This application is a continuation of U.S. patent application Ser. No. 16/864,826, filed May 1, 2020, which claims the benefit of U.S. Provisional Application No. 62/847,592, filed on May 14, 2019, the entire contents of each of which are incorporated herein by reference and for all purposes.

FIELD

This relates generally to simulation systems, and more specifically to adversarial reinforcement learning for simulating security checkpoint environments.

BACKGROUND

Security checkpoints are used to protect sensitive and secure physical environments such as airport terminals, national borders, government facilities, and sensitive public spaces. In configuring security checkpoints, officials are faced with design choices as to how to deploy, position, configure, and use various threat-mitigation devices used at security checkpoints, such as x-ray machines, metal detectors, body-scanner devices, and the like. Furthermore, officials are faced with design choices as to how human security agents and canine security agents should be deployed, positioned, and applied to potential threats. The design and configuration of security checkpoints have obvious implications for their effectiveness at promoting human safety and institutional security. Furthermore, said design and configuration choices also have financial significance; for example, the Transportation Security Administration (TSA) spends about $8 billion per year to secure transportation infrastructure in the United States, about $3.6 billion of which is spent on personnel costs and about $450 million of which is spent on technology procurement.

SUMMARY

As explained above, security checkpoint design has safety implications and significant financial implications.

However, efficiently designing and configuring security checkpoints poses unique challenges due to the nature of the risks that security checkpoints are designed to mitigate. That is, the risks that security checkpoints are designed to mitigate can be very low-probability risks; consider, there have been no major successful terrorist plots against a secure (terminal) side of a U.S. airport since Sep. 11, 2001, while TSA has processed over ten billion passengers and invested over $100 billion in airport security over that time. Thus, the amount of historic data points for the effectiveness of security checkpoints against various adversarial threats is very low. This lack of data makes design decisions and investment decisions difficult. Whether those design and investment decisions are made by human analysts or by machine-learning systems, the lack of historical data means that there is simply very little basis from which to discern what design choices are safest and what investment choices are most efficient. Accordingly, there is a need for improved systems and methods for analyzing the effectiveness and efficiency of checkpoint security designs, layouts, configurations, and strategic investments.

Disclosed herein are systems and methods for using adversarial reinforcement learning to simulate security checkpoints in order to determine effective and efficient security checkpoint configurations. In some embodiments, a physical security checkpoint environment may be simulated containing various threat-mitigation objects (e.g., x-ray machines, scanners, etc.) and various threat objects (e.g., weapons carried by adversaries/attackers). The simulated environment may then be configured to be controlled by two (or more) adversarial machine-learning models that are configured to control the simulation to attempt to achieve adverse goals. A defense model may be configured to provide inputs to the simulation in order to attempt to configure and/or deploy the threat-mitigation objects in the simulated environment to maximize safety and efficiency of the checkpoint, whereas an attack model may be configured to provide inputs to the simulation to control simulated adversaries to wield simulated threat objects against the security checkpoint (to try to either smuggle threat objects through the checkpoint or to deploy said threat objects against the checkpoint itself). The simulation may be allowed to execute a large number of iterations in which the defense model and the attack model may adjust their strategies based on the results of previous iterations in order to attempt to maximize effectiveness. After a large number of iterations, the system may reach an equilibrium under which attack and defense strategies appear to be optimized under the constraints for the simulated scenario and environment. Information regarding the attack and defense strategies may then be output by the system and may be used to configure a corresponding real-world security checkpoint and/or to guide strategic and technological investment for one or more real-world security checkpoints.

In some embodiments, a method for simulating a security checkpoint is provided, the method performed by an adversarial reinforcement learning system comprising one or more processors, the method comprising: executing a first portion of a simulation of a security checkpoint to generate an outcome of the first portion of the simulation; generating, by a first model, a threat mitigation input, wherein the threat mitigation input comprises instructions for controlling one or more of a plurality of simulated threat-mitigation objects in a subsequent portion of the simulation, wherein the threat mitigation input is generated based at least in part on the outcome of the first portion; generating, by a second model, a threat input, wherein the threat input comprises instructions for controlling one or more of a plurality of simulated threat objects in the subsequent portion of the simulation, wherein the threat input is generated based at least in part on the outcome of a first portion; and executing the subsequent portion of the simulation based at least in part of the threat mitigation input and the threat input.

In some embodiments, the method comprises receiving, by the first model, a first set of information regarding the simulated security checkpoint, wherein generating the threat mitigation inputs is based on the first set of information; and receiving, by the second model, a second set of information regarding the simulated security checkpoint, wherein generating the threat inputs is based on the second set of information.

In some embodiments, a threat-mitigation object of the plurality of threat-mitigation objects is simulated in accordance with an associated effectiveness at mitigating an outcome associated with one or more threat objects of the plurality of threat objects.

In some embodiments, the effectiveness comprises a likelihood of detecting the one or more threat objects.

In some embodiments, the effectiveness comprises a capability to decrease severity of the outcome associated with the one or more threat objects.

In some embodiments, a first threat object of the plurality of threat objects is simulated in accordance with an outcome associated with the first threat object.

In some embodiments, the outcome associated with the first threat object is based on a location of the first threat object within the simulated security checkpoint.

In some embodiments, the outcome associated with the first threat object is associated with a combination of the first threat object and a second threat object.

In some embodiments: a threat object of the plurality of threat objects is simulated in accordance with synthetic data generated by a synthetic data generator; a threat-mitigation object of the plurality of threat-mitigation objects is simulated in accordance with an automated threat-detection algorithm; and executing the simulation comprises applying the automated threat-detection algorithm to the synthetic data.

In some embodiments, the method comprises automatically receiving environment data regarding the security checkpoint to be simulated, wherein executing the simulation of the security checkpoint is based on the environment data received.

In some embodiments, the method comprises automatically receiving object data regarding one or more of the threat-mitigation objects or one or more of the threat objects to be simulated, wherein executing the simulation of the security checkpoint is based on the object data received.

In some embodiments, generating the threat mitigation input is performed in accordance with a first set of asset limitations that limits the threat-mitigation objects that may be deployed in the simulation.

In some embodiments, generating the threat input is performed in accordance with a second set of asset limitations that limits the threat objects that may be deployed in the simulation.

In some embodiments, the method comprises ceasing executing one or more of the portions of the simulated environment in accordance with determining that one or more stability criteria have been satisfied.

In some embodiments, the method comprises generating output data representing a configuration of the plurality of threat mitigations represented by the threat mitigation inputs for one of the portions of the simulation.

In some embodiments, the method comprises generating output data representing a plurality of threats represented by the threat inputs for one of the portions of the simulation.

In some embodiments: executing the first portion of the simulation comprises executing a first time-step of the simulation; executing the subsequent portion of the simulation comprises executing a subsequent time-step of the simulation occurring, in the simulated environment, after the first time-step of the simulation.

In some embodiments: executing the first portion of the simulation comprises executing a first iteration of the simulation; executing the subsequent portion of the simulation comprises executing a subsequent iteration of the simulation executed after the first iteration of the simulation.

In some embodiments, an adversarial reinforcement learning system for simulating a security checkpoint is provided, the system comprising one or more processors configured to: execute a first portion of a simulation of a security checkpoint to generate an outcome of the first portion of the simulation; generate, by a first model, a threat mitigation input, wherein the threat mitigation input comprises instructions for controlling one or more of a plurality of simulated threat-mitigation objects in a subsequent portion of the simulation, wherein the threat mitigation input is generated based at least in part on the outcome of the first portion; generate, by a second model, a threat input, wherein the threat input comprises instructions for controlling one or more of a plurality of simulated threat objects in the subsequent portion of the simulation, wherein the threat input is generated based at least in part on the outcome of a first portion; and execute the subsequent portion of the simulation based at least in part of the threat mitigation input and the threat input.

In some embodiments, a non-transitory computer-readable storage medium is provided, the non-transitory computer-readable storage medium storing instructions configured to be executed by one or more processors of an adversarial reinforcement learning system the instructions configured to cause the system to: execute a first portion of a simulation of a security checkpoint to generate an outcome of the first portion of the simulation; generate, by a first model, a threat mitigation input, wherein the threat mitigation input comprises instructions for controlling one or more of a plurality of simulated threat-mitigation objects in a subsequent portion of the simulation, wherein the threat mitigation input is generated based at least in part on the outcome of the first portion; generate, by a second model, a threat input, wherein the threat input comprises instructions for controlling one or more of a plurality of simulated threat objects in the subsequent portion of the simulation, wherein the threat input is generated based at least in part on the outcome of a first portion; and execute the subsequent portion of the simulation based at least in part of the threat mitigation input and the threat input.

In some embodiments, any one or more of the characteristics of any one or more of the systems, methods, and/or computer-readable storage mediums recited above may be combined, in whole or in part, with one another and/or with any other features or characteristics described elsewhere herein.

DETAILED DESCRIPTION

Described herein are exemplary embodiments of systems and methods for simulating security checkpoint environments using adversarial reinforcement learning that may address the problems and shortcomings of known systems and methods for configuring security checkpoints described above.

In some embodiments, an adversarial reinforcement learning system and a simulation engine may be deployed together to simulate a security checkpoint. A plurality of iterations of the simulated security checkpoint may be controlled by the adversarial reinforcement learning system, whereby a defense model configures threat-mitigation objects in the simulated environment and an attack model controls threat objects in the simulated environment. Given predefined constraints as to layout, size, and resources for the checkpoint and for adversaries attacking the checkpoint, the system may iteratively simulate attacks against the checkpoint such that each of the adversarial models attempts to optimize its strategies. After a large number of iterations (e.g., after the adversarial models have reached a stable configuration/strategy over many iterations), information regarding the strategies deployed by the two models may be output from the system and may be leveraged in configuring one or more corresponding real-world security checkpoints.

Exemplary System

Figure 1:
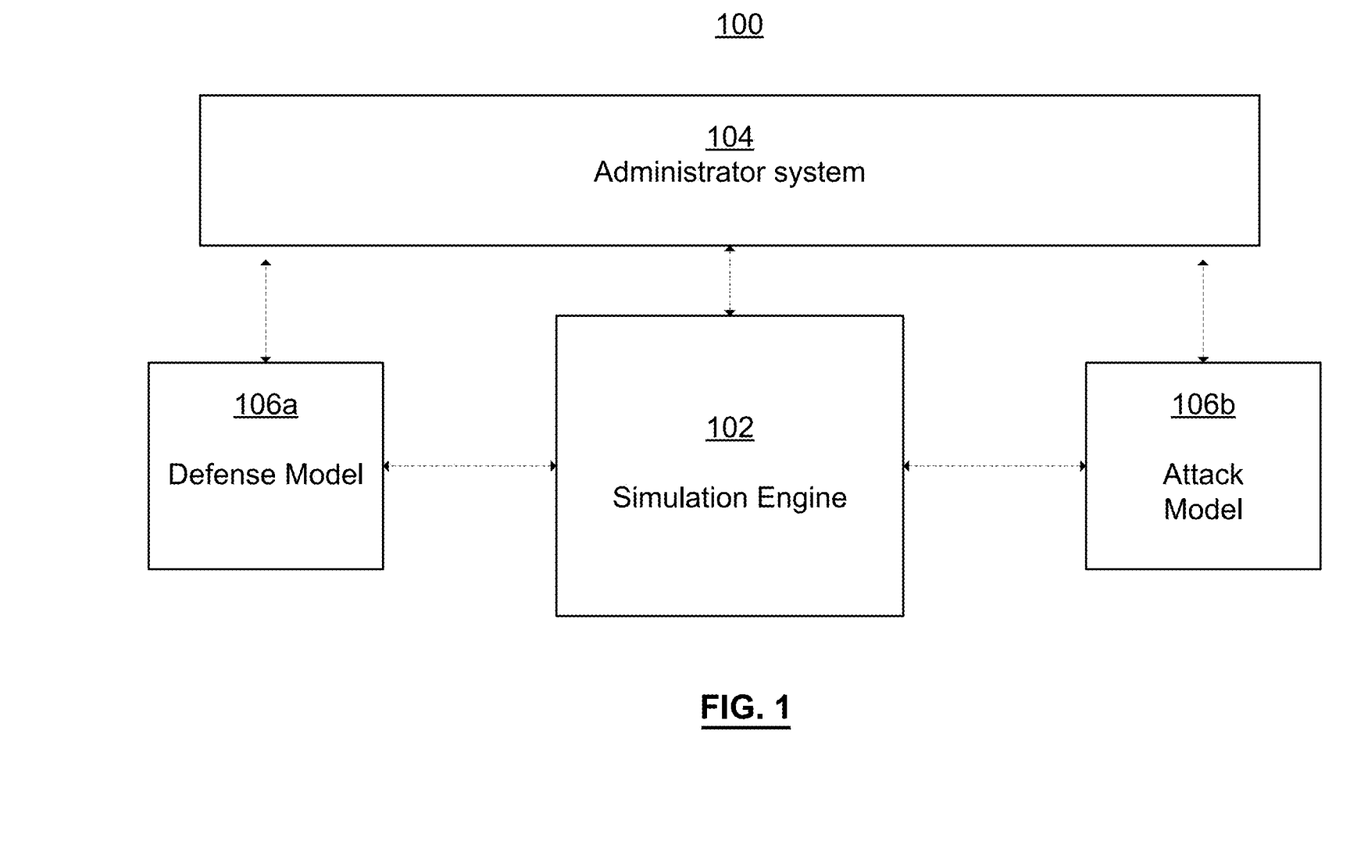
FIG. 1 depicts a system for simulating security checkpoint environments using adversarial reinforcement learning, according to some embodiments.

FIG. 1 depicts a system 100 for simulating security checkpoint environments using adversarial reinforcement learning, according to some embodiments. System 100 may comprise simulation engine 102, administrator system 104, defense model 106a, and attack model 106b. Defense model 106a and attack model 106b may together constitute an adversarial reinforcement learning system which may be referred to as adversarial reinforcement learning system 106. As described in detail herein, simulation engine 102 may execute simulations of a security checkpoint environment in accordance with inputs (e.g., controls) received from adversarial reinforcement learning system 106, and adversarial reinforcement learning system 106 may be configured to adaptively learn and to adjust strategies to optimize inputs in order to achieve desired outcomes in the simulated environment.

Simulation engine 102 may comprise any one or more computer systems configured to execute simulations of a security checkpoint environment. In some embodiments, simulation engine 102 may comprise any one or more processors, personal computers, super-computers, servers, and/or virtual machines configured to execute instructions stored locally or remotely to build, store, and/or execute one or more iterations of a simulation of a security checkpoint. In some embodiments, simulation engine 102 may allow a user or controlling system to exercise control over entities, objects, and behaviors within the simulated environment. For example, a user or controlling system may be able to control (1) entities travelling through the simulation (e.g., people, whether or not those entities are terrorists/adversaries), (2) objects in the simulation (e.g., detectors, including how detection happens when an entity is at an object), and (3) paths that entities take within the simulated environment (e.g., if an entity is detected, where do they go). This arrangement may enable a user or controlling system to have control over entities carrying or wielding threat objects, over detectors having controllable detection rates for detecting or mitigating threat objects, and over behaviors and outcomes (e.g., what happens to an entity if a detector detects or does not detect a threat object being carried and/or wielded by the entity?).

As described herein, a simulation of a security checkpoint may comprise software configured to, when executed by one or more processors, render (and in some embodiments display one or more visualizations of) one or more simulations of a security checkpoint environment, wherein the simulated environment comprises (1) a simulated spatial environment/layout, (2) a plurality of simulated threat-mitigation objects, and (3) a plurality of simulated threat objects.

In some embodiments, the simulated spatial environment/layout of the simulation may comprise bounds defining the spatial extent of the physical environment in which threat-mitigation objects and/or threat objects may be positioned and may function within the simulated environment. In some embodiments, the simulated spatial environment/layout of the simulation may comprise a "game-board" layout configured to accept placement of threat-mitigation objects or threat object and/or configured to allow structured movement of the objects within the simulated environment.

In some embodiments, the plurality of simulated threat objects may include simulations of devices and/or objects that may pose a threat of harm to an area beyond the security checkpoint and/or to the security checkpoint itself. For example, simulated threat objects may include firearms, blades, explosives, incendiaries, other weapons, and/or other prohibited materials (e.g., benign liquids such as water may be considered threat objects if they are nevertheless prohibited due to an over-inclusive security policy banning all liquids).

In some embodiments, threat objects may be simulated in accordance with one or more associated respective outcomes. In some embodiments, an outcome of a threat object may include data characterizing the nature (e.g., type) and/or severity of damage or harm that may be caused by the threat object. In some embodiments, an outcome of a threat object may comprise a quantification or other characterization of harm or damage that may be inflicted by the threat object, including property damage inflicted by the threat object, injuries or loss of life inflicted by the threat object, and/or political, social, or economic damage or loss that may be inflicted by the threat object. In some embodiments, an outcome of a threat object may be characterized by a numerical value quantifying the severity of harm/loss that may be inflicted by the threat object. In some embodiments, the numerical value may be a dollar amount characterizing a monetary value associated with the modeled outcome; in some embodiments, the numerical value may be a score on a non-monetary scale.

In some embodiments, different outcomes may be associated with the same threat object depending on the location of the threat object within the simulated environment. For example, greater harm may be associated with a firearm if the firearm is successfully smuggled through the security checkpoint environment (e.g., to a terminal side of an airport security checkpoint) than if the firearm is merely brought to a metal detector of the security checkpoint. In another example, greater harm may be associated with an explosive device if the explosive device is detonated at a crowded security checkpoint line than if the device is detonated inside an x-ray machine or in a sparsely populated area at the periphery of a security checkpoint environment. The magnitude of a numerical value associated with these different outcomes may vary in accordance with the severity of the harm associated with the outcome, as determined in part based on the location of the threat object in the simulated environment.

In some embodiments, different outcomes may be associated with the same threat object depending on whether the threat object is positioned in proximity to one or more adversarial actors (e.g., a simulated terrorist or other simulated attacker in the simulation). For example, some threat objects may be ineffective or less effective if they are not controlled by an adversarial actor, and the magnitude of a numerical value associated with different outcomes of the threat object may vary in accordance with whether the object is located near an adversarial actor in the simulation who may operate or control the threat object.

In some embodiments, different outcomes may be associated with the same threat object depending on whether the threat object is positioned in proximity to one or more checkpoint agents or civilians. For example, some threat objects may be more or less effective at inflicting harm/damage at a distance than in close proximity to victims, and the magnitude of a numerical value associated with different outcomes of the threat object may vary in accordance with whether the object is located near a victim in the simulation.

In some embodiments, different outcomes may be associated with the same threat object depending on whether the threat object is positioned in proximity to one or more additional threat objects within the simulation. Some outcomes may depend on more than one threat object being brought together in the same place at the same time. In some embodiments, the combined outcomes associated with a plurality of different threat objects may be greater than the sum of the outcomes of the individual threat objects. For example, some threat objects may be ineffective at inflicting harm/damage in isolation, but may be able to be combined with one another to inflict harm or damage. For example, ammunition and a firearm may be simulated in accordance with outcomes modeling greater harm/damage when the firearm and ammunition are located together in the same place than in situations in which only one is present without the other. The magnitude of a numerical value associated with different outcomes of a threat object may thus vary in accordance with whether the object is located near one or more other threat objects in the simulation.

In some embodiments, the plurality of simulated threat-mitigation objects may include simulations of security devices and/or personnel, including but not limited to: x-ray machines, body-scanner devices, metal detectors, bottled liquid scanners, electronic trace detectors, human operators of one or more machines, human security officers, canine security officers, etc.

In some embodiments, threat-mitigation objects may be simulated in accordance with a capability to detect and/or mitigate one or more outcomes of a threat object. In some embodiments, capabilities of detecting a threat object may be modeled in accordance with data representing an automated threat detection algorithm of a device. In some embodiments, capabilities of detecting and/or mitigating a threat object may be modeled in accordance with data regarding the historical effectiveness of performance of human security agents and/or canine security agents. In some embodiments, certain agents and/or threat-mitigation objects may be more effective at detecting and/or mitigating certain kinds of threat object than other kinds of threat objects (e.g., a metal detector may not detect a plastic object) and their capabilities may be modeled accordingly. In some embodiments, certain agents and/or threat-mitigation objects may be more or less effective at detecting and/or mitigating certain threat objects at a distance versus at close proximity (e.g., a canine officer may be more likely to detect an explosive device at close range than from a distance), and their performance within the simulation may be modeled accordingly.

In some embodiments, detection and/or mitigation of a threat object by a threat-mitigation object may eliminate a threat outcome associated with the threat object (e.g., a numerical score associated with the threat outcome may be reduced to zero). In some embodiments, detection and/or mitigation of a threat object by a threat-mitigation object may reduce but not eliminate a threat outcome associated with the threat object (e.g., a numerical score associated with the threat outcome may be reduced to a non-zero number). In some embodiments, the location in the security checkpoint at which a threat object is detected may determine, at least in part, whether and the extent to which associated outcomes of the threat object are reduced and/or eliminated. In some embodiments, the proximity of a threat object to one or more adversarial agents, non-adversarial agents, and/or one or more other threat objects at the time of its detection by a threat-mitigation object may determine, in part, whether and the extent to which associated outcomes of the threat object are reduced and/or eliminated.

In some embodiments, simulation engine 102 may be communicatively coupled with (e.g., configured to send and/or receive wired and/or wireless network transmissions to and/or from) administrator system 104. In some embodiments, administrator system 104 may be any one or more computer systems configured to accept inputs from a system administrator to configure or otherwise control simulation engine 102 (and/or attack model 106 as discussed below). In some embodiments, administrator system may be provided by a same or different set of one or more processors that provide simulation engine 102.

Administrator system 104 may be configured to accept inputs from an administrator for configuring one or more aspects of the simulated security checkpoint provided by simulation engine 102. In some embodiments, an administrator may provide inputs to administrator system 104 to cause control signals to be transmitted to simulation engine 102 to configure one or more constraints for the simulated security checkpoint. In some embodiments, constraints for the simulated security checkpoint may include: security checkpoint environment size/shape/layout, threat objects available to attackers/adversaries in the simulation; threat object properties (e.g., outcome capabilities, interactions with agents, interactions with the simulated environment, interactions with other threat objects); and/or threat object properties (e.g., capabilities to detect and/or mitigate various types of threat objects in different simulated scenarios/arrangements).

In some embodiments, constraints specified by a user via administrator system 104 may also include constraints as to the number of iterations of a simulation to be run, the types of inputs that the simulation may accept to configure threat-mitigation objects and/or to control threat objects (as discussed in further detail below), the information from the simulation available to one or more adversarial models executing controls against the simulation, and/or information output from the simulation regarding configurations and/or metrics of the one or more simulation iterations.

In some embodiments, constraints specified by a user via administrator system 104 may include constraints as to in-simulation assets available to defense model 106a and/or to attack model 106b as discussed below. In some embodiments, in-simulation assets that are available to one or both models 106a and 106b may include a characterization or quantification of the value of threat-mitigation objects or threat objects that may be deployed within the simulation. In some embodiments, in-simulation asset limits may be defined by a numerical quantification such as a monetary value, and various in-simulation objects may be assigned respective numerical costs or monetary values. In this way, the defense model and attack model controlling the threat-mitigation objects and threat objects in the simulation may be constrained in the value and quantity of objects that may be deployed within the simulation. Using in-simulation asset limitations to limit the quantity and quality of objects that may be deployed in the simulation may cause the models 106a and 106b, as discussed below, to attempt to optimize outcomes (e.g., minimize harm inflicted on the simulated checkpoint or maximize harm inflicted on the simulated checkpoint) of the simulation while also achieving those outcomes efficiently and within constraints (e.g., expenditure constraints) that are practicable for application in real-world security checkpoint scenarios. In some embodiments, allowing an administrator to adjust asset allocations may allow system 100 to be applied to assess the maximum possible effectiveness/safety of security checkpoints with different amounts of funding.

In addition to or alternatively to accepting configurations from administrator system 104 based on manual user inputs, system 100 may be configured such that administrator system 104 may transmit configuration instructions to simulation engine 102 based on one or more automated processes. For example, administrator system 102 may be configured to automatically ingest data from one or more data sources regarding characteristics of real-world checkpoints, real-world threat-mitigation objects, and or real-world threat objects to be modeled in a simulation. Administrator system 102 (and/or an associated system) may in some embodiments receive said data via one or more APIs. Administrator system 102 (and/or an associated system) may in some embodiments use said data to generate one or more inputs for configuring constraints of the simulation executed by simulation engine 102.

In some embodiments, the simulation engine may be configured to automatically receive data regarding an environment to be simulated and/or the nature and characteristics of one or more objects in the simulated environment. For example, the simulation engine may be configured to automatically receive (e.g., via one or more APIs) information regarding a physical layout of a security checkpoint, and may be configured to automatically receive (e.g., via one or more APIs) information regarding the nature and performance (e.g., quantifications of harm outcomes, quantifications of threat recognition effectiveness) of one or more objects to be simulated. For example, as automated threat recognition algorithms associated with a threat-mitigation object to be simulated are improved (e.g., by continuous efforts to improve the effectiveness and accuracy of the algorithms, for example through machine learning), those improvements may be automatically pushed to the simulation engine and automatically integrated into the simulation of the security checkpoint. In this way, the simulation engine may be able to automatically update the simulation based on the newest available data from one or more data sources without the need for manual user intervention.

In some embodiments, simulation engine 102 may be communicatively coupled with (e.g., configured to send and/or receive wired and/or wireless network transmissions to and/or from) both defense model 106a and attack model 106b, the two of which may collectively be a part of an adversarial reinforcement learning system 106 configured to provide inputs for controlling one or more simulations executed by simulation engine 102. In some embodiments, adversarial reinforcement learning system 106 may be configured to apply any one or more adversarial reinforcement learning algorithms, including but not limited to one or more value-based algorithms (e.g., Q learning), policy-based algorithms, actor-critic algorithms, advantage actor-critic algorithms, and/or asynchronous advantage actor-critic algorithms.

The simulation of a security checkpoint provided by simulation engine 102 may be configured to accept (a) threat mitigation inputs for configuring and controlling one or more threat-mitigation objects within the simulated environment and (b) threat inputs for configuring and controlling one or more threat objects within the simulated environment. Defense model 106a may be configured to provide threat mitigation inputs to simulation engine 102, wherein defense model 106a is configured to attempt to minimize harmful/damaging outcomes created by threat objects in the simulation, and attack model 106b may be configured to provide threat inputs to simulation engine 102, wherein attack model 106b is configured to attempt to maximize harmful/damaging outcomes created by threat objects in the simulation. In some embodiments in which simulation engine 102 characterizes harmful/damaging outcomes created by threat objects in the simulation using a numerical score quantifying the harmful outcomes, defense model 106a may be configured to attempt to minimize the numerical score while attack model 106b may be configured to attempt to maximize the numerical score.

In some embodiments, simulation engine 102 may be configured to accept inputs from models 106a and 106b in an alternating or otherwise turn-based manner for a single iteration of the simulation; in some embodiments, simulation engine 102 may be configured to accept inputs from models 106a and 106b simultaneously. In some embodiments, simulation engine 102 may be configured to accept a plurality of threat-mitigation inputs to deploy, arrange, and configure one or more threat-mitigation objects in the simulation and to thereafter accept one or more threat inputs for controlling one or more adversarial agents in the simulation to attempt to use one or more threat objects to attack and/or traverse the threat-mitigation objects; in this way, the threat-mitigation inputs may in some embodiments create a static defensive arrangement which attack model 106b may then assess and attempt to traverse.

In some embodiments, defense model 106a may be configured such that models 106a and 106b may have access to respective sets of information about the simulation that may be used as a basis for formulating their respective inputs for controlling objects in the simulation. In some embodiments, the information visible to one or both of the models 106a and 106b may include various information about the simulated environment, such as layout of the environment, simulated agents (e.g., people, security officers, security canines, civilians, attackers/terrorists) in the environment, and/or expected behavior of simulated agents in the environment.

In some embodiments, information visible to the two models 106a and 106b may be different. In some embodiments, one model may have access to more information than the other model. For example, in some embodiments, the amount of information available to defense model 106a may be greater than the information available to attack model 106b; this arrangement may, for example, simulate situations in which a security agency such as the TSA may have greater institutional knowledge about a security checkpoint layout that is not available to adversaries/attackers.

In some embodiments, information available to attack model 106b may include certain information about one or more threat mitigation inputs for a current iteration of the simulation that have been inputted by the defense model 106a. That is, attack model 106b may be able to access and leverage certain information about a defensive configuration created by the first model, and may thus be able to make decisions about vectors of attack for a current iteration of the simulation based on that visible information about current defensive configuration/layout.

In some embodiments, simulation engine 102 may be configured to accept a respective set of threat mitigation inputs from defense model 106a and to accept a respective set of threat inputs from attack model 106b for each iteration of the simulation. Thus, in embodiments in which multiple iterations of the same simulation are executed successively, each model 106a and 106b may provide a new respective set of inputs for each successive iteration. In some embodiments, each model 106a and 106b may have access to some or all output information and/or metrics regarding one or more previous iterations of the simulation, and said information may be used by one or more of the models as a basis for formulating a new set of inputs for an upcoming iteration of the simulation. In this way, the models 106a and 106b may improve and optimize strategies by learning what inputs are successful at achieving goals (e.g., maximizing or minimizing harm outcomes) and overcoming, circumventing, or thwarting the opposing model's strategies.

In some embodiments, the output information that is available to the models 106a and 106b to be used as a potential basis for inputs for future simulation iterations may be symmetric between the models. In some embodiments, the output information available to the models may be asymmetric, in that the models 106a and 106b may have access to different respective subsets of the available output information.

In some embodiments, as shown in FIG. 1, one or both of defense model 106a and attack model 106b may be communicatively coupled to administrator system 104 to allow administrator system 104 to transmit configuration and control commands to the models and/or to allow the models to transmit information about execution of the simulations back to administrator system 104.

It should be noted that, in some embodiments, some or all network communication between the various illustrated components of system 100 may be performed via direct communicative link (e.g., as illustrated) and/or may be performed via indirect communicative link (e.g., one or both of models 106a and 106b may communicate with simulation engine 102 by transmitting messages via administrator system 104, rather than directly).

Although FIG. 1 is shown as having a simulation engine 102, administrator system 104, defense model 106a, and attack model 106b, it is also contemplated that one or more of the components of FIG. 1 may be provided as different components of a combined computing system, such as different processes executable by a single processor; and/or that one or more of the components of FIG. 1 may be provided as a single processing component or module.

In some embodiments, a system for simulating security checkpoint environments using adversarial reinforcement learning (such as system 100) may include one or more synthetic data generators (not illustrated in FIG. 1). A synthetic data generator may be any computer system configured to generate synthetic data that realistically and effectively simulated real-world data of a certain data type. For example, a synthetic data generator may be used to generate photorealistic synthetic images of faces of people who do not actually exist. In the checkpoint security space, synthetic data may be particularly useful because of privacy restrictions that prevent the collection, storage, and/or widespread use of real-world checkpoint security data. For example, privacy restrictions prevent the storage of body-scanner images collected by TSA, which means that simulation systems such as those described herein may not have access to corpuses of body-scanner data that could be used to simulate the performance of automated threat-detection algorithms against real-world body-scanner data. Thus a synthetic data generator system may, in some embodiments, be used instead of a corpus of actual image data (or other data) to generate synthetic image data (or other data) that may be analyzed by an automated threat-detection algorithm as part of execution of the simulation. In this way, the performance of actual automated threat-detection algorithms may be modeled within the simulation, rather than simply abstracting aspects of the performance of automated threat-detection algorithms (for example by modeling a threat-detection algorithm as a simplified likelihood of detection of a threat object) in the simulation. For these purposes, a synthetic data generator may in some embodiments be deployed as part of a simulation engine and/or an administrator system to generate synthetic data to which one or more threat-detection algorithms may be applied as part of executing an iteration of a simulated security checkpoint.

In some embodiments, a synthetic data generator may additionally or alternatively be used to generate data (e.g., images, simulation data) for one or more synthetic bags and/or synthetic persons. A synthetic bag and/or synthetic person may be configured to attempt to conceal one or more synthetic threats that correspond to the physical properties of one or more real-world threats.

Exemplary Method

Figure 2:
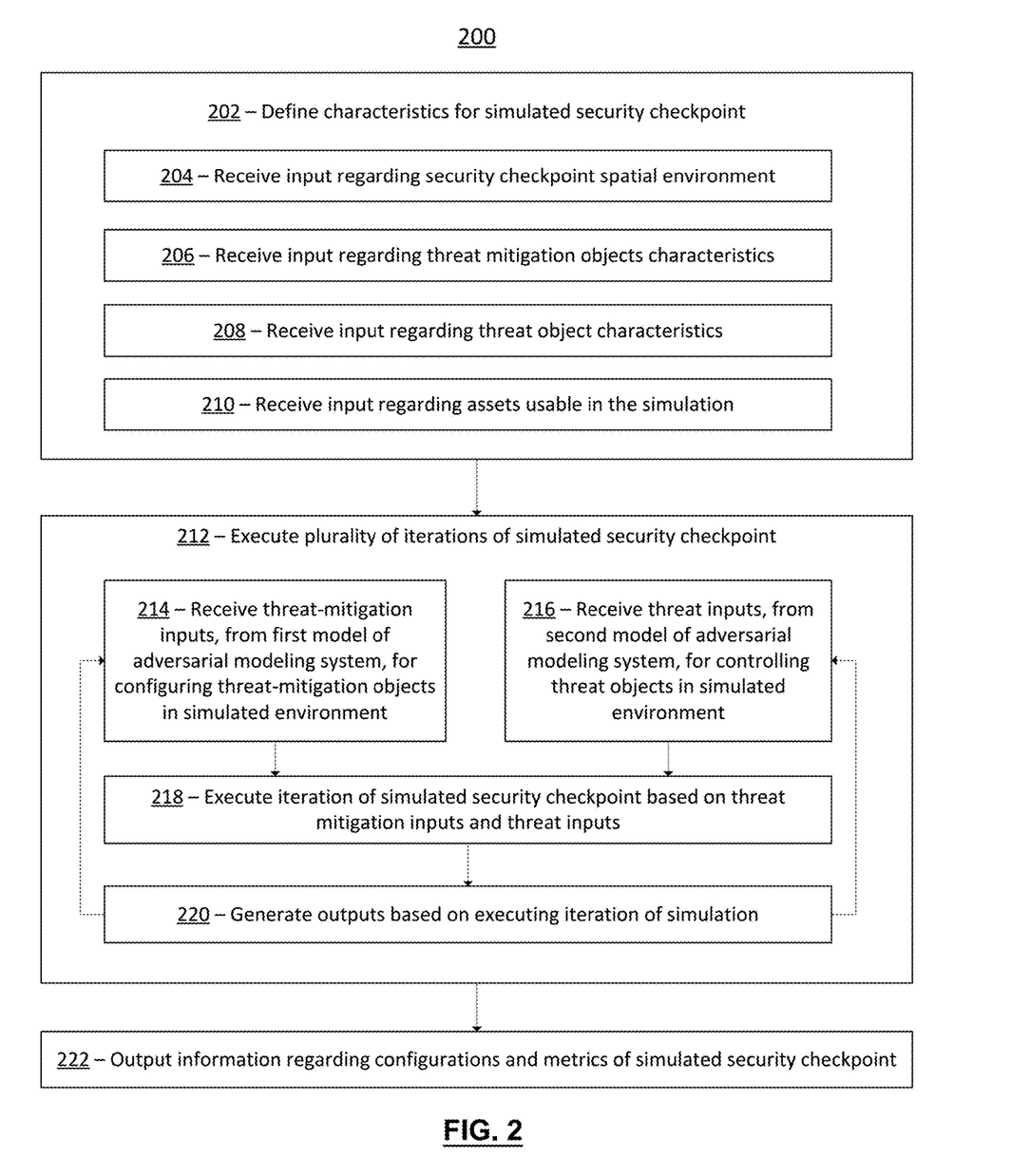
FIG. 2 depicts a flowchart representing an exemplary method for simulating security checkpoint environments using adversarial reinforcement learning, according to some embodiments.

FIG. 2 depicts a method 200 for simulating security checkpoint environments using adversarial reinforcement learning, according to some embodiments. In some embodiments, method 200 may be performed by a system for simulating security checkpoint environments using adversarial reinforcement learning, such as system 100 as described above.

At block 202, in some embodiments, the system may define one or more characteristics for a simulated security checkpoint. In some embodiments, defining one or more characteristics for a simulated security checkpoint may comprise generating and storing data allowing the system to execute one or more iterations of a simulation of the simulated security checkpoint. In the example of system 100, defining one or more characteristics for the simulation may be performed by simulation engine 102 in accordance instructions transmitted from administrator system 104 regarding constraints and/or other parameters or instructions for configuring characteristics of the simulation.

In some embodiments, characteristics for the simulated security checkpoint may be based on inputs manually entered by a user (e.g., a system administrator configuring the simulation). In some embodiments, characteristics for the simulated security checkpoint may be based on data or other information received from one or more automated data ingestion processes, including but not limited to ingesting data, such as via one or more APIs, regarding real-world security checkpoints, real-world security checkpoint policies/procedures, real-world security checkpoint resources (e.g., budgetary information), real-world threat-mitigation objects, and/or real-world threat objects.

At block 204, in some embodiments, defining one or more characteristics for the simulated security checkpoint may be based on receiving input regarding the security checkpoint spatial environment to be simulated. For example, the system may receive information regarding a physical layout (e.g., shape, size, characteristics of different spatial areas, etc.) of a security checkpoint. This information may be used, in some embodiments, to create a "game board" for the simulated environment upon which one or more simulated threat-mitigation objects and/or threat objects may be deployed and upon which one or more simulated agents (e.g., simulated security officers, simulated attackers/adversaries, simulated civilians, etc.) may navigate. In some embodiments, the received information regarding the security checkpoint spatial environment to be simulated may be based on one or more real-world security checkpoints (e.g., the simulation may be configured to simulate a specific checkpoint), while in some embodiments the information regarding the security checkpoint spatial environment to be simulated may not be based on any existing real-world security checkpoint (e.g., the simulation may be configured to test a potential design for a new security checkpoint).

At block 206, in some embodiments, defining one or more characteristics for the simulated security checkpoint may be based on receiving input regarding characteristics of one or more threat-mitigation objects to be simulated. For example, the system may receive information including a list of different threat-mitigation objects that are available for deployment in the simulated security checkpoint. The system may additionally receive information regarding the characteristics of respective threat-mitigation objects available for deployment.

Characteristics of respective threat-mitigation objects may include capabilities of a respective threat-mitigation object to detect and/or mitigate various respective threat objects. For example, the information received may include a likelihood of detecting a certain kind of threat object (in various situations/arrangements), which may in some embodiments be based on an automated threat-detection algorithm deployed by a real-world threat-mitigation object that is being simulated. Furthermore, the information may include a degree to which a respective threat-mitigation object is able to reduce (and/or eliminate) a harm/damage outcome of a certain kind of threat object (in various situations/arrangements). In the case of mitigating harm/damage outcomes of a threat object, the information may include a raw value and or a percentage by which a threat-mitigation object may reduce a quantified value of a harm/damage outcome of the threat object.

In some embodiments, the information may include information regarding what arrangements (e.g., spatial relationships) may cause a threat-mitigation object to detect or mitigate an outcome of a threat object. For example, some threat-mitigation objects may be simulated such that they have a higher probability to detect a threat object at closer proximities and a lower probability of detecting the threat object across larger distances.

Characteristics of respective threat-mitigation objects may include information regarding their size, shape, weight, and/or other physical properties of the threat-mitigation object. In some embodiments, a threat-mitigation object's physical characteristics may determine how it may be positioned within the simulated environment (e.g., where on the "game-board" the threat-mitigation object may be positioned).

Characteristics of respective threat-mitigation objects may include information regarding how a threat-mitigation object interacts with one or more other objects and/or agents in the simulated environment; for example, whether a threat-mitigation object can be carried by a person, how it can be positioned in the simulated environment, whether a person can interact with the object (e.g., by moving it, carrying it, walking through it, repositioning it, etc.).

In some embodiments, the received information regarding the threat-mitigation objects to be simulated may be based on one or more real-world threat-mitigation objects (e.g., the simulation may be configured to simulate the performance of existing real-world equipment), while in some embodiments the information regarding the security checkpoint spatial environment to be simulated may not be based on any existing real-world threat-mitigation objects (e.g., the simulation may be configured to test a potential new design for new security equipment).

At block 208, in some embodiments, defining one or more characteristics for the simulated security checkpoint may be based on receiving input regarding characteristics of one or more threat objects to be simulated. For example, the system may receive information including a list of different threat objects that are available for deployment in the simulated security checkpoint. The system may additionally receive information regarding the characteristics of respective threat objects available for deployment.

Characteristics of respective threat objects may include capabilities of a respective threat object to cause outcomes representing harm/damage within the simulated environment. The information may include an indication of the nature/type of harm/damage that may be caused by a threat object (e.g., loss of life, injury, property damage, political damage, etc.) and/or a characterization or quantification of the extent of the harm/damage that may be caused by a threat object. As discussed above, in some embodiments, outcomes may be characterized by a quantification of harm or damage, such as a numerical score and/or a monetary value.

In some embodiments, the information received may include a likelihood of a threat object inflicting a certain kind of harmful outcome (in various situations/arrangements), which may in some embodiments be based on information about a real-world threat object or class of threat objects that are being simulated. In some embodiments, the information received may include a likelihood of a threat object being detected and/or mitigated by a threat-mitigation object, which in some embodiments may be based on known information about the implicated threat-mitigation object and/or an automated threat-detection algorithm employed thereby.

Furthermore, the information may include a degree to which a harm/damage outcome of a respective threat object is able to be reduced (and/or eliminated) by a certain kind of threat-mitigation object (in various situations/arrangements). In the case of a harm/damage outcome of a threat object being reduced or mitigated by any one of various threat-mitigation objects, the information about the threat object may include a raw value and or a percentage by which the various threat-mitigation objects may reduce a quantified value of a harm/damage outcome of the threat object.

In some embodiments, the information may include information regarding what arrangements (e.g., spatial relationships) or other in-simulation situations may cause a threat object to inflict one or more of its outcomes (e.g., information may include whether the threat object may inflict damage from afar or whether it must be nearby a victim to inflict damage). In some embodiments, the information may include information regarding what arrangements (e.g., spatial relationships) or other in-simulation situations may cause a threat object to be more or less likely to be detected or mitigated by one or more respective threat-mitigation objects. For example, some threat objects may be simulated such that they have a higher probability of being detected by a threat-mitigation object at closer proximities and a lower probability of being detected by the threat-mitigation object across larger distances.

Characteristics of respective threat objects may include information regarding their size, shape, weight, and/or other physical properties of the threat object. In some embodiments, a threat object's physical characteristics may determine how it may be positioned within the simulated environment (e.g., where on the "game-board" the threat-mitigation object may be positioned).

Characteristics of respective threat-mitigation objects may include information regarding how a threat object interacts with one or more other objects and/or agents in the simulated environment; for example, whether a threat object can be carried by a person, whether/how it may be concealed, how it can be positioned in the simulated environment, whether a person can interact with the object (e.g., by moving it, carrying it, wielding it, triggering it, repositioning it, etc.).

In some embodiments, the received information regarding the threat objects to be simulated may be based on one or more real-world threat objects (e.g., the simulation may be configured to simulate the performance of known types of weapons or other known types of threats), while in some embodiments the information regarding the security checkpoint spatial environment to be simulated may not be based on any existing real-world threat objects (e.g., the simulation may be configured to test performance of potential new designs for novel weapons or improvised threat devices).

At block 210, in some embodiments, defining one or more characteristics for the simulated security checkpoint may be based on receiving input regarding assets usable in the simulated security checkpoint.

In some embodiments, the information may specify a quantification for resources that are available to be expended on threat-mitigation objects or other threat-mitigation efforts within an iteration of the simulation. Thus, the simulation may be configured to test effectiveness levels for checkpoints under different levels of funding for security agencies. In some embodiments, asset limitations may be expressed as a numerical quantification (e.g., a numerical value or monetary value that may be "spent" on threat-mitigation objects and/or threat-mitigation staff). In some embodiments, asset limitations may be expressed as a limitation on a number or quantity of certain kinds of threat-mitigation objects that may be deployed (e.g., a numerical limit on the number of human security agents available at a checkpoint).

In some embodiments, the information may specify a quantification for resources that are available to be expended on threat objects or other attacker/terrorist efforts within an iteration of the simulation. Thus, the simulation may be configured to test effectiveness levels for checkpoints against adversarial forces of different levels of sophistication and/or funding. In some embodiments, asset limitations may be expressed as a numerical quantification (e.g., a numerical value or monetary value that may be "spent" on threat objects and/or attacker personnel). In some embodiments, asset limitations may be expressed as a limitation on a number or quantity of certain kinds of threat objects that may be deployed (e.g., a numerical limit on the number of human attackers/terrorists available to assail a checkpoint).

In some embodiments, in addition to defining characteristics for the simulated security checkpoint itself (e.g., as explained with respect to block 202), the system may further be configured to define information about how the simulation should be run. For example, the system may receive, generate, and/or store data indicating how many iterations of a simulation should be run, what computing resources or components should be used to run a simulation, when a simulation should be run, one or more conditions for beginning or ending one or more iterations of a simulation, information regarding permissions for configuring a simulation, and/or information regarding permissions for viewing or receiving output/metrics information regarding a simulation.

At block 212, in some embodiments, after defining the characteristics of the simulated security checkpoint as well as threat-mitigation object and threat objects available to be deployed therein, the system may execute a plurality of iterations of the simulated security checkpoint. As explained herein, execution of an iteration of the simulation by a simulation engine (e.g., simulation engine 102) may comprise receiving a set of threat-mitigation inputs and a set of threat inputs to control threat-mitigation objects and threat objects within the simulation, respectively. As explained in further detail below, the system may be configured such that the simulation engine accepts the respective sets of inputs from two different models of an adversarial reinforcement learning system, such as model defense model 106a and attack model 106b as described above with respect to FIG. 1. One of the models (e.g., defense model 106a) may be configured to attempt to minimize the harm/damage outcomes that are inflicted in the iteration of the simulation, while the other one of the models may be configured to attempt to maximize the harm/damage outcomes that are inflicted in the iteration of the simulation. In this way, each of the models may attempt to thwart and overcome the efforts of the other model, and may attempt, based on the information available to each model (including information about outcomes from prior iterations), over successive iterations of the simulation, to optimize the strategies that it applies in generating and providing its inputs.

At block 214, in some embodiments, executing the plurality of iterations of the simulated security checkpoint may be based on receiving threat-mitigation inputs, from a first model of an adversarial reinforcement learning system, for configuring threat-mitigation objects in a respective iteration of the simulated security checkpoint environment. As discussed above, a threat-mitigation input may be any instructions input to the simulation engine for configuring or otherwise controlling one or more simulated threat-mitigation objects within the simulation. For example, threat-mitigation inputs may comprise instructions for selecting one or more available threat-mitigation objects to be deployed in a simulated environment, for spatially positioning one or more threat-mitigation objects in the simulated environment, and/or for configuring one or more settings, practices, or behaviors of deployed threat-mitigation objects in the simulated environment.

At block 216, in some embodiments, executing the plurality of iterations of the simulated security checkpoint may be based on receiving threat inputs, from a second model of an adversarial reinforcement learning system, for configuring or otherwise controlling threat objects in the respective iteration of the simulated security checkpoint environment. As discussed above, a threat input may be any instructions input to the simulation engine for configuring or otherwise controlling one or more simulated threat objects within the simulation. For example, threat inputs may comprise instructions for selecting one or more available threat objects to be deployed in a simulated environment, for spatially positioning and/or maneuvering one or more threat objects in the simulated environment, for configuring one or more settings, practices, or behaviors of deployed threat objects in the simulated environment, and/or for causing one or more threat objects to inflict one or more harm/damage outcomes in the simulated environment.

With respect to blocks 214 and 216, in some embodiments, one or both of the models may be configured to generate their respective inputs based on information available to the respective model. In some embodiments, the models may be configured such that they have access to respective sets of information about the simulation that may be used as a basis for formulating their respective inputs for controlling objects in the simulation. In some embodiments, the information visible to one or both of the models may include various information about the simulated environment, such as layout of the environment, simulated agents (e.g., people, security officers, security canines, civilians, attackers/terrorists) in the environment, and/or expected behavior of simulated agents in the environment.

In some embodiments, the information visible to the different models may be different. In some embodiments, one model may have access to more information than the other model. For example, in some embodiments, the amount of information available to the first model (e.g., defense model 106a) may be greater than the information available to the second model (e.g., attack model 106b); this arrangement may, for example, simulate situations in which a security agency such as the TSA may have greater institutional knowledge about a security checkpoint layout that is not available to adversaries/attackers.

In some embodiments, information available to the second model (e.g., attack model 106b) may include certain information about one or more threat mitigation inputs for a current iteration of the simulation that have been inputted by the first model (e.g., defense model 106a). That is, the second model may be able to access and leverage certain information about a defensive configuration created by the first model, and may thus be able to make decisions about vectors of attack for a current iteration of the simulation based on that visible information about current defensive configuration/layout.

At block 218, in some embodiments, the system may execute the respective iteration of the simulated security checkpoint based on the received threat-mitigation inputs and the received threat inputs. In the example of system 100 in FIG. 1, the respective iteration of the simulation may be executed by simulation engine 102.

In some embodiments, executing the respective iteration of the simulation may comprise simulating a predefined amount of time in the simulation. For example, the simulation may be configured such that each iteration simulates a predefined window of time, such as 5 minutes, 10 minutes, 15 minutes, 30 minutes, 1 hour, 2 hours, 6 hours, 12 hours, 1 day, 1 week, or 1 month. In some embodiments, a simulation may be executed in an amount of time that is less than the amount of in-simulation time represented by the simulation. For example, the simulation may represent a span of minutes, hours, days, weeks, months, or years, but may be executed in a time span of less than 1 month, less than 1 weeks, less than 1 day, less than 1 hour, less than 10 minutes, or less than 1 minute. In some embodiments, the simulation engine may be configured to receive inputs (e.g., threat-mitigation inputs and/or threat inputs) during execution of the simulation, whereas in some embodiments the simulation engine may be configured such that inputs (e.g., all threat-mitigation inputs and/or all threat inputs) for an iteration of the simulation are all received before execution of the simulation.

At block 220, in some embodiments, the system may generate output data based on executing the respective iteration of the simulation.

In some embodiments, the output data may comprise one or more visualizations of the execution of an iteration of the simulation. The visualization may include visualizations of data/metrics regarding the simulation (e.g., configurations of simulated objects, outcomes occurring in the simulation) and/or may include a rendered visualization of the simulated environment itself (e.g., a rendered visual depiction of the security checkpoint being simulated). In some embodiments, one or more visualizations of the simulation may be displayed and updated in real-time during execution of the iteration of the simulation; in some embodiments, one or more visualizations of the simulation may be displayed after execution of the iteration of the simulation.

In some embodiments, the output data may comprise information characterizing and/or quantifying one or more harm/damage outcomes of the simulation iteration. For example, as discussed above, the output information may characterize a type and/or quantify a severity of loss of life, injury, property damage, monetary loss, and/or political damage caused within the simulated environment. In some embodiments, these outcomes may express specific information about how and where damage/harm was inflicted as well as expressing a total quantification of the extent of harm/damage that was inflicted in the simulation. In some embodiments, the output data characterizing and/or quantifying harm outcomes may be stored to a log, output and/or transmitted for review by one or more users, and/or used by the system for generating inputs for future iterations of the simulation.

As shown in the flow chart of FIG. 2, following block 220, the method may revert to blocks 214 and/or 216, where a next round of threat-mitigation inputs and/or threat inputs may be generated by the adversarial reinforcement learning system (e.g., by the first and second models). As discussed above, in some embodiments, the models may use the output data from one or more previous iterations of the simulation in order to generate inputs for the next iteration(s) of the simulation. In this manner, the first model (e.g., a defense model) may analyze information regarding harm/damage outcomes from one or more previous iterations of the simulation and may adjust inputs for a next iteration accordingly, in order to attempt to thwart previously successful attack strategies and to minimize harm/damage outcomes in future iterations. Conversely, the second model (e.g., an adversary/attacker model) may analyze information regarding harm/damage outcomes from one or more previous iterations of the simulation and may adjust inputs for a next iteration accordingly, in order to attempt to overcome previously successful defense strategies and to maximize harm/damage outcomes in future iterations.

In some embodiments, this iterative process of executing iterations may continue for any suitable number of iterations. In some embodiments, the number of iterations of a simulation performed may be greater than 100, greater than 1,000, greater than 1,000,000, or greater than 100,000,000. (In some embodiments, the number of simulation time-steps (e.g., atomic units of simulated time within the simulation) per iteration may be greater than 1,000, greater than 10,000, greater than 100,000, greater than 1,000,000, or greater than 10,000,000). In some embodiments, the number of iterations of a simulation that are executed may be a predefined number of iterations.

In some embodiments, the number of iterations of a simulation that are executed may be a dynamically determined number of iterations. For example, in some embodiments, a system may be configured to determine when one or more models have "stabilized" and to thereafter cease executing additional iterations. In some embodiments, the system may determine that one or both of the models have stabilized in accordance with one or more stability criteria being satisfied. For example, the system may detect that simulation inputs generated by one or more models of an adversarial reinforcement learning system have stabilized over a plurality of successive iterations. This may be determined on the basis that the inputs are identical or similar to one another (e.g., fall within a predefined or dynamically determined variance of one another) over a predefined or dynamically determined number of successive iterations (or over a predefined or dynamically determined threshold percentage of a successive series of iterations). In some embodiments, the system may be configured to cease executing additional iterations when at least one model (e.g., either a defense model or an attack model) stabilizes. In some embodiments, the system may be configured to cease executing additional iterations when both models in a pair (e.g., both a defense model and an attack model) stabilize.

Alternately or additionally to detecting stabilization in inputs/strategies executed over a plurality of iterations, a system may be configured to detect a stabilization in outcomes over a plurality of iterations. For example, in some embodiments, if a harm/damage output quantification is above a predefined (or dynamically determined threshold for more than a predefined (or dynamically determined) number of iterations (or for some predefined or dynamically determined percentage of iterations thereof), then the system may determine that the attacker/attack model has overwhelmed and defeated the defense model, and the simulation may be terminated. Similarly, in some embodiments, if a harm/damage output quantification is below a predefined (or dynamically determined threshold for more than a predefined (or dynamically determined) number of iterations (or for some predefined or dynamically determined percentage of iterations thereof), then the system may determine that the defense model has overwhelmed and defeated the attacker/attack model, and the simulation may be terminated. In some embodiment, a simulation may be terminated based on a smaller number of attacker successes, whereas terminating the simulation based on defender successes may require a higher number of consecutive successes in order to do so.

At block 222, in some embodiments, the system may generate and output information regarding configurations and metrics of the plurality of iterations of the simulated security checkpoint. The output information regarding configurations may include information regarding threat-mitigation inputs and/or threat inputs on which one or both models stabilized. In this way, the system may be configured to output information about security checkpoint defense and security checkpoint attack strategies on that were determined to be most optimal by the adversarial reinforcement learning system. In some embodiments, this information may be stored, outputted, and/or transmitted for analysis by one or more users.

In some embodiments, information regarding optimized threat-mitigation configurations and strategies may be used to automatically configure one or more real-world threat mitigation devices. For example, information regarding a setting for a threat-mitigation device may be transmitted to a real-world security checkpoint system and used to automatically configure settings of security devices used therein, such that the real-world security devices may emulate the optimized settings determined in the simulation system.

In some embodiments, output information regarding metrics of the simulation may include any information about the simulated environment from one or more of the iterations of the simulation, including but not limited to inputs executed, objects deployed, object configurations, object performance, harm/damage outcomes simulated, resources/assets expended, and/or the manner in which one or more strategies was adapted over multiple iterations of the simulation. In some embodiments, information regarding the strategies applied by one or more of the adversarial models may be stored, displayed, and/or transmitted for use by one or more users of the system. Said information may in some embodiments be used to make decisions for real-world security checkpoint environments regarding designing checkpoints, deploying personnel and security equipment in said checkpoints, setting policies/procedures for said checkpoints, configuring settings of security devices in said checkpoints, and/or for making decisions regarding resource/funding allocation for said checkpoints.

In some embodiments, output information regarding metrics of the simulation may include any information about the simulation system itself, including number of iterations executed, time for execution of one or more iterations, performance information regarding the simulation engine, and/or performance information regarding on or more of the adversarial models.

While the disclosure herein has been set forth by way of examples in which an attack model and a defense model of an adversarial reinforcement learning system may generate inputs for controlling a simulation based on one or more outputs from previous iterations of the simulation, it should be understood that, in some embodiments, an adversarial reinforcement learning system may be configured such that an attack model and/or a defense model may generate inputs for controlling a simulation based on one or more outputs or outcomes of an earlier portion of an ongoing iteration of the simulation. That is, the models may in some embodiments make adjustments and adaptations in real-time during execution of an iteration of the simulation, such that a model may react to an earlier occurrence in the iteration of the simulation and/or may update one or more strategies based on results of earlier actions taken in the iteration of the simulation. In some embodiments, a model may be configured to adapt as frequently as with each time-step of an iteration of a simulation, wherein a time-step of the simulation may simulate the most atomic unit of time within the simulated environment (e.g., one minute, one second, one microsecond, etc.). An adversarial reinforcement learning system may accordingly be configured to perform any operation disclosed herein with respect to an iteration of a simulation in a similar manner with respect to a time-step (or any other portion of one or more iterations) of a simulation. For example, an adversarial reinforcement learning system may be configured to generate data representing outcomes of the simulation after executing a time-step of the simulation, such that output data regarding the outcomes of the time-step may be used by the one or more models to generate inputs for one or more subsequent time-steps of the simulation.

As used herein, the term "time-step" may refer to an atomic unit of simulated time (e.g., one minute, one second, one microsecond, etc.) within the simulated environment, while the term "iteration" may refer to an end-to-end execution of a simulated environment spanning seconds, minutes, hours, days, weeks, months, or years of simulated time. Simulated events at earlier time-steps in a given iteration of a simulated environment may be causally linked to simulated events at later time-steps in the same iteration of the simulated environment, whereas different iterations of the same simulated environment may be causally unrelated to one another. As used herein, the term "portion" may refer to one or more time-steps of a simulation and/or to one or more iterations of a simulation.

Exemplary Computing Components

Figure 3:
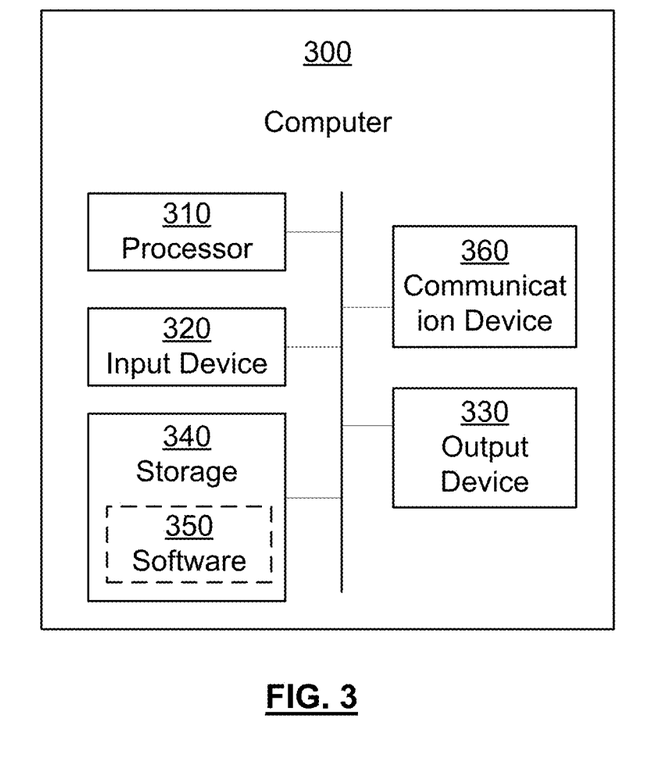
FIG. 3 depicts a computer, according to some embodiments.

FIG. 3 illustrates a computer, in accordance with some embodiments. Computer 300 can be a component of a system for simulating security checkpoint environments using adversarial reinforcement learning, such as system 100 and/or any of its subcomponents described above with respect to FIG. 1. In some embodiments, computer 300 may be configured to execute a method for simulating security checkpoint environments using adversarial reinforcement learning, such as all or part of method 200 of FIG. 2. In some embodiments, computer 300 may be configured to execute any of the other techniques discussed herein, alone and/or in combination with one another and/or with method 200.

Computer 300 can be a host computer connected to a network. Computer 300 can be a client computer or a server. As shown in FIG. 3, computer 300 can be any suitable type of microprocessor-based device, such as a personal computer; workstation; server; or handheld computing device, such as a phone or tablet. The computer can include, for example, one or more of processor 310, input device 320, output device 330, storage 340, and communication device 360.

Input device 320 can be any suitable device that provides input, such as a touch screen or monitor, keyboard, mouse, or voice-recognition device. Output device 330 can be any suitable device that provides output, such as a touch screen, monitor, printer, disk drive, or speaker.

Storage 340 can be any suitable device that provides storage, such as an electrical, magnetic, or optical memory, including a RAM, cache, hard drive, CD-ROM drive, tape drive, or removable storage disk. Communication device 360 can include any suitable device capable of transmitting and receiving signals over a network, such as a network interface chip or card. The components of the computer can be connected in any suitable manner, such as via a physical bus or wirelessly. Storage 340 can be a non-transitory computer-readable storage medium comprising one or more programs, which, when executed by one or more processors, such as processor 310, cause the one or more processors to execute methods described herein, such as all or part of method 200 described with respect to FIG. 2.

Software 350, which can be stored in storage 340 and executed by processor 310, can include, for example, the programming that embodies the functionality of the present disclosure (e.g., as embodied in the systems, computers, servers, and/or devices as described above). In some embodiments, software 350 can be implemented and executed on a combination of servers such as application servers and database servers.

Software 350 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 340, that can contain or store programming for use by or in connection with an instruction execution system, apparatus, or device.

Software 350 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 300 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines. Computer 300 may be composed of components which are interconnected across a network, such as a distributed system. Computer 300 may be organized into any suitable topology, such as a star topology, a recursively defined topology, a mesh topology, a ring topology, or an ad-hoc topology.

Computer 300 can implement any operating system suitable for operating on the network. Software 350 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for simulating a spatial environment, the method performed by an adversarial reinforcement learning system comprising one or more hardware processors, the method comprising:
    generating, by a first model, a threat mitigation input, wherein the threat mitigation input comprises instructions for controlling one or more simulated objects in the simulation, wherein the first model is configured to minimize one or more harm outcomes of the simulation; and
    generating, by a second model, a threat input, wherein the threat input comprises instructions for controlling one or more simulated objects in the simulation, wherein the second model is distinct from the first model and is configured to maximize one or more harm outcomes of the simulation; and
    executing a first portion of the simulation based at least in part on the threat mitigation input and the threat input.

2. The method of claim 1, comprising:
    receiving, by the first model, a first set of information regarding the simulated spatial environment, wherein generating the threat mitigation inputs is based on the first set of information; and
    receiving, by the second model, a second set of information regarding the simulated spatial environment, wherein generating the threat inputs is based on the second set of information.

3. The method of claim 1, wherein a first simulated object in the simulation is simulated in accordance with an associated effectiveness at mitigating an outcome associated with a second simulated object in the simulation.

4. The method of claim 3, wherein the effectiveness comprises a likelihood of detecting the second simulated object.

5. The method of claim 3, wherein the effectiveness comprises a capability to decrease severity of the outcome associated with the second simulated object.

6. The method of claim 1, wherein a second simulated object in the simulation is simulated in accordance with an outcome associated with the second simulated object.

7. The method of claim 6, wherein the outcome associated with the second simulated object is based on a location of the second simulated object within the simulated spatial environment.

8. The method of claim 6, wherein the outcome associated with the second simulated object is associated with a combination of the second simulated object and a third simulated object in the simulation.

9. The method of claim 1, wherein:
a simulated object associated with the threat input is simulated in accordance with synthetic data generated by a synthetic data generator;
a simulated object associated with the threat-mitigation input is simulated in accordance with an automated threat-detection algorithm; and
executing the first portion of the simulation comprises applying the automated threat-detection algorithm to the synthetic data.

10. The method of claim 1, comprising automatically receiving environment data regarding the spatial environment to be simulated, wherein executing the first portion of the simulation of the spatial environment is based on the environment data received.

11. The method of claim 1, comprising automatically receiving object data regarding one or more of the objects to be simulated, wherein executing the first portion of the simulation of the spatial environment is based on the object data received.

12. The method of claim 1, wherein generating the threat mitigation input is performed in accordance with a first set of asset limitations that limits a first class of objects that may be deployed in the simulation.

13. The method of claim 1, wherein generating the threat input is performed in accordance with a second set of asset limitations that limits a second class of objects that may be deployed in the simulation.

14. The method of claim 1, further comprising:
determining that one or more stability criteria have been satisfied; and
ceasing executing the simulation in accordance with determining that the one or more stability criteria have been satisfied.

15. The method of claim 1, further comprising generating output data representing a configuration of a plurality of threat mitigations represented by the threat mitigation inputs for the simulation.

16. The method of claim 1, further comprising generating output data representing a plurality of threats represented by the threat inputs for the simulation.

17. The method of claim 1, comprising:
prior to executing the first portion of the simulation, executing a prior portion of the simulation to generate an outcome of the prior portion of the simulation;
wherein generating the threat mitigation input is performed based at least in part on the outcome of the prior portion of the simulation; and
wherein generating the threat input is performed based at least in part on the outcome of the prior portion of the simulation.

18. The method of claim 17, wherein:
executing the prior portion of the simulation comprises executing a first time-step of the simulation; and
executing the first portion of the simulation comprises executing a second time-step of the simulation occurring, in the simulated environment, after the first time-step of the simulation.

19. The method of claim 17, wherein:
executing the prior portion of the simulation comprises executing a first iteration of the simulation; and
executing the first portion of the simulation comprises executing a second iteration of the simulation executed after the first iteration of the simulation.

20. An adversarial reinforcement learning system for simulating a spatial environment, the system comprising one or more hardware processors configured to:
generate, by a first model, a threat mitigation input, wherein the threat mitigation input comprises instructions for controlling one or more simulated objects in the simulation, wherein the first model is configured to minimize one or more harm outcomes of the simulation; and
generate, by a second model, a threat input, wherein the threat input comprises instructions for controlling one or more simulated objects in the simulation, wherein the second model is distinct from the first model and is configured to maximize one or more harm outcomes of the simulation; and
execute a first portion of the simulation based at least in part on the threat mitigation input and the threat input.

21. A non-transitory computer-readable storage medium storing instructions configured to be executed by one or more hardware processors of an adversarial reinforcement learning system the instructions configured to cause the system to:
generate, by a first model, a threat mitigation input, wherein the threat mitigation input comprises instructions for controlling one or more simulated objects in the simulation, wherein the first model is configured to minimize one or more harm outcomes of the simulation; and
generate, by a second model, a threat input, wherein the threat input comprises instructions for controlling one or more simulated objects in the simulation, wherein the second model is distinct from the first model and is configured to maximize one or more harm outcomes of the simulation; and
execute a first portion of the simulation based at least in part on the threat mitigation input and the threat input.

* * * * *